(12) United States Patent
Colmagro et al.

(10) Patent No.: US 10,730,634 B2
(45) Date of Patent: Aug. 4, 2020

(54) PRIMARY SUPPORT STRUT STRUCTURE FOR AN AIRCRAFT

(71) Applicant: AIRBUS OPERATIONS (S.A.S.), Toulouse (FR)

(72) Inventors: Jérôme Colmagro, Toulouse (FR); Julien Moulis, Le Castera (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 15 days.

(21) Appl. No.: 16/172,416

(22) Filed: Oct. 26, 2018

(65) Prior Publication Data

US 2019/0127073 A1 May 2, 2019

(30) Foreign Application Priority Data

Oct. 27, 2017 (FR) ...................................... 17 60192

(51) Int. Cl.
*B64D 27/26* (2006.01)
*B64F 5/10* (2017.01)
*B33Y 80/00* (2015.01)
*B64D 27/12* (2006.01)

(52) U.S. Cl.
CPC ................ *B64D 27/26* (2013.01); *B64F 5/10* (2017.01); *B33Y 80/00* (2014.12); *B64D 27/12* (2013.01); *B64D 2027/264* (2013.01)

(58) Field of Classification Search
CPC .. B64D 27/26; B64D 27/12; B64D 2027/264; B64F 5/10; B33Y 80/00
See application file for complete search history.

(56) References Cited

U.S. PATENT DOCUMENTS

| | | | |
|---|---|---|---|
| 9,027,875 B2 * | 5/2015 | West ..................... | B64C 1/1453 244/53 R |
| 10,351,254 B2 * | 7/2019 | Journade ................ | B64D 27/26 |
| 2008/0217502 A1 * | 9/2008 | Lafont ................... | B64D 27/26 248/554 |
| 2008/0251634 A1 * | 10/2008 | Bernardi ................ | B64D 27/18 244/54 |
| 2009/0283631 A1 * | 11/2009 | Roche ...................... | B64C 7/02 244/54 |
| 2011/0121132 A1 | 5/2011 | Crook et al. | |
| 2013/0140281 A1 * | 6/2013 | Crook .................... | B64D 27/18 219/121.14 |
| 2014/0151497 A1 | 6/2014 | Weir et al. | |
| 2017/0106990 A1 * | 4/2017 | Journade ................ | B64D 27/26 |

FOREIGN PATENT DOCUMENTS

| | | |
|---|---|---|
| FR | 3 042 475 | 4/2017 |
| WO | 2007/036516 | 4/2007 |
| WO | 2008/006826 | 1/2008 |

OTHER PUBLICATIONS

Search Report for FR1760192 dated Apr. 19, 2018, 2 pages.

* cited by examiner

*Primary Examiner* — Anita M King
(74) *Attorney, Agent, or Firm* — Nixon & Vanderhye P.C.

(57) ABSTRACT

A primary support strut structure and a method of manufacturing thereof for an aircraft power plant is disclosed having a first half-shell including a first free edge, and a second half-shell having a second free edge. The first half-shell and the second half-shell are assembled together by joining the first free edge and the second free edge so as to form a box-shaped structure. The two half-shell construction results in very rigid box structure, and a reduced number of ribs in the primary structure.

13 Claims, 5 Drawing Sheets

PRIMARY SUPPORT STRUT STRUCTURE FOR AN AIRCRAFT

CROSS REFERENCE TO RELATED APPLICATION

This application claims priority to and incorporates by reference French Patent Application Number 1760192 filed Oct. 27, 2017.

BACKGROUND

Field of the Invention

The disclosure generally relates to truss structures and, more specifically, to primary support struts for an aircraft power plant.

Description of the Related Art

Figure 1:
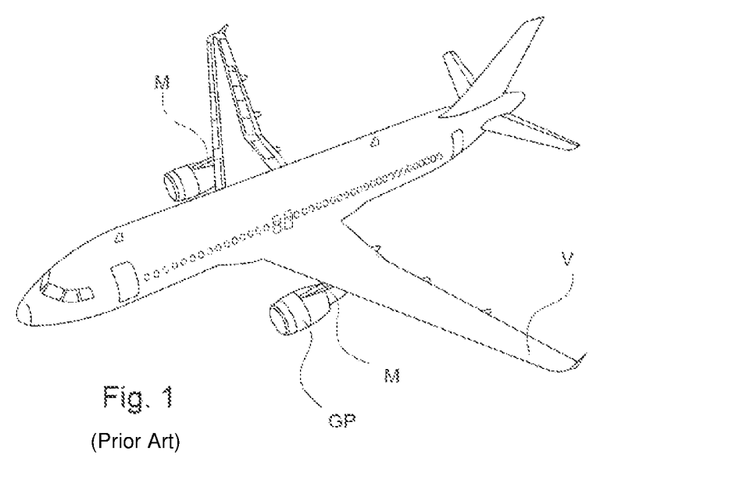
FIG. 1 is a perspective view of an aircraft having a support strut for a power plant.

Referring to FIG. 1, an aircraft is shown having a strut M. The strut M is the link element between a propulsion assembly or power plant GP, which includes an engine and a nacelle, and the wing V or the fuselage of the aircraft.

The aircraft power plant support strut M includes a primary structure which takes up and transmits the forces subjected to the strut, and a secondary structure, which may be an aerodynamic fairing. The fairing or secondary structure may accommodate the cables and tubing which link a power plant or engine to the rest of the aircraft.

The primary structure may include a box-shaped structure. The box-shaped structure may include a plurality of substantially parallel ribs. The primary structure is formed by having the top and bottom spars and the side plates attached to the ribs. The primary structure having a box configuration provides a greater stiffness and greater strength on the strut, and transmits forces between the power plant and the structure of the aircraft while having a low weight.

The primary structure of the strut M further comprises linking ties to link the strut to the aircraft on the one end, and to the power plant GP or engine at the other end.

Figure 2:
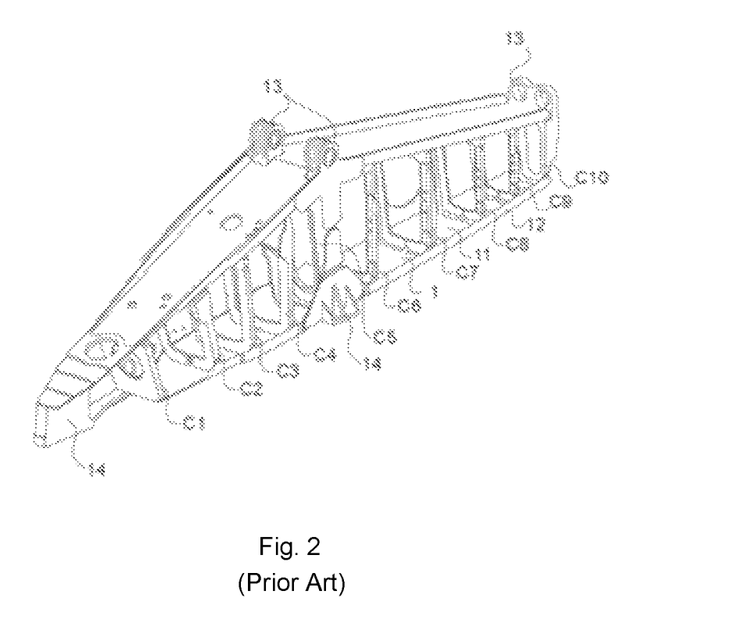
FIG. 2 is a perspective view of a prior art primary support strut structure for an aircraft power plant.

Referring to FIG. 2, a prior art the primary structure of a strut for an aircraft power plant is constructed by forming a framework, and then adding ribs C1 to C10 to a bottom spar 1. More specifically, FIG. 2 illustrates a primary structure of a strut for an aircraft power plant where the side plates on one side have been omitted to leave the internal structure visible.

The bottom spar 1 comprises a bottom surface 11, and can comprise longitudinal flanges 12 which confers upon it a certain rigidity and allows it to serve as base part for the production of the framework of the strut.

The ribs C1 to C10 are assembled on the bottom spar land are aligned longitudinally and each installed transversely in a direction orthogonal to the longitudinal direction. The bases of the ribs C1 to C10 on the bottom spar 1 are therefore parallel to one another. The ribs are installed vertically for some (ribs C5 to C10 in the example represented) or slightly inclined relative to the vertical (ribs C1 to C4, the horizontal being embodied by the bottom spar 1).

On the duly constructed framework, various anchoring means or various ties (for the link to a power plant on the one hand, and to an aircraft structure on the other hand) are added and fixed onto the framework, onto the ribs in particular. A bottom spar (in one or two parts) is added, as are side plates.

The various essential elements and components are assembled by riveting.

The primary structure of the strut thus has a general box structure or box-shaped configuration, and comprises linking ties with the structure of an aircraft 13 and linking ties with an aircraft power plant 14.

Moreover, EP 1928741 discloses a primary strut structure for an aircraft power plant with simplified architecture through the use of a monolithic frame.

Manufacturing such a primary structure is however complex. Furthermore, this structure can be even further enhanced in order to offer aircraft architecture optimization possibilities.

SUMMARY

The present disclosure is embodied as a primary support strut structure of an aircraft power plant having a box structure which comprises a first half-shell comprising a first free edge and a second half-shell comprising a second free edge. The first half-shell and the second half-shell are assembled together by joining the first free edge and the second free edge so as to form said box.

In an exemplary embodiment, the primary support strut structure includes two half-shells, the construction of which makes it possible to reduce the final cost price of the primary structure and of the strut and offers potential savings in terms of cycle time for the production of an aircraft power plant support strut. It makes it possible to obtain a very rigid box structure, which makes it possible to limit the number of ribs in the primary structure. The limiting of the number of ribs also frees up space inside the box structure which is formed, which allows this space to be allocated to functions other than the securing of the power plant, for example to the running of electrical, hydraulic or fuel conduits. The ribs can make it possible, by adapting the number and the position thereof, to obtain the desired mechanical characteristics as a function of the embodiment considered, and according to the mechanical characteristics of the side walls.

The first half-shell and the second half-shell can be assembled along a joint plane. In a first embodiment, the primary support strut structure of an aircraft power plant comprises a bottom spar and two side walls substantially orthogonal to the bottom spar, and the joint plane is orthogonal to the bottom spar and splits it longitudinally into two, so as to divide the box into two symmetrical parts.

In a second embodiment, the primary support strut structure of an aircraft power plant comprises a bottom spar and two side walls substantially orthogonal to the bottom spar, and the joint plane is orthogonal to the side walls, each of which it divides into two parts.

The side walls can have a cellular structure.

Such a primary structure can further comprise precisely three ribs interposed transversely in the box.

In a first joining mode, the first free edge is butt-jointed to the second free edge.

In a second joining mode, the first free edge and the second free edge have an area of overlap.

The primary support strut structure of an aircraft power plant can comprise at least one tongue which covers the joint between the first free edge and the second free edge, the tongue being linked to the first half-shell and to the second half-shell.

The invention relates also to a method for manufacturing a primary support strut structure of an aircraft power plant comprising the steps of:

forming a first half-shell comprising a first free edge;

forming a second half-shell comprising a second free edge; and, attaching the first half-shell and of the second half-shell together by joining the first free edge and the second free edge so as to form a box structure.

BRIEF DESCRIPTION OF THE DRAWINGS

For an understanding of embodiments of the disclosure, reference is now made to the following description taken in conjunction with the accompanying drawings, in which.

In the accompanying drawings, like reference characters refer to the same or similar parts throughout the different views. The drawings are not necessarily to scale, emphasis instead being placed upon illustrating particular principles, discussed below.

DETAILED DESCRIPTION OF SOME EMBODIMENTS

Some embodiments will now be described with reference to the Figures.

FIG. 1 described hereinabove illustrates a commercial passenger aircraft, and FIG. 2 described hereinabove illustrates general elements or elements corresponding to the state of the art for an aircraft engine support structure.

Figure 3:
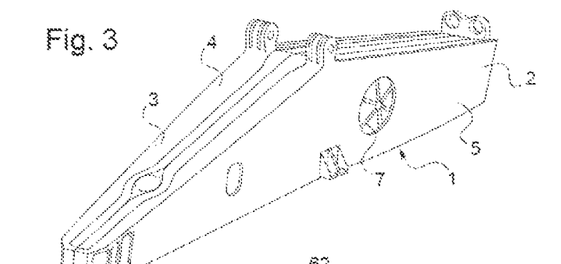
FIG. 3 is a perspective view of a primary support strut structure for an aircraft power plant in accordance with an exemplary embodiment.

Referring now to FIG. 3, a primary support structure of an aircraft power plant according to an exemplary embodiment is illustrated. The primary support structure of an aircraft power plant represented in FIG. 3 comprises a first half-shell 2 and a second half-shell 3. The first and second half-shells from a box-shaped structure when assembled together.

Each half-shell corresponds to a three-dimensional piece which comprises an open zone delimited by a free edge. The open zone is wide by comparison to the dimensions of the half-shell, and can correspond to an open face of the piece. Each half-shell thus has an internal volume accessible through the open zone. The first free edge 21 of the first half-shell 2 should match, at least mostly, the second free edge 31 of the second half-shell 3 in order to allow the first and second free edges 21, 31 to be joined together, so as to form the box of the primary structure. That is, the first free edge 21 is a peripheral edge bounding an opening and forming a hollow space which is spaced apart from the side wall 5. Similarly, the second free edge 31 of the second half-shell is a perhaps edge bounding an opening and forming a hollow space which is spaced apart from the side wall 5. The first and second free edges, 21, 31 substantially line up when the first and the second half-shells are assembled together. The primary support structure may include a bottom spar 1, a top spar 4, and two side walls 5.

In the embodiment of FIG. 3, the first half-shell 2 and the second half-shell 3 are symmetrical. The bottom spar 1 and the top spar 4 are divided into two by a joining portion between the two half-shells 2, 3. Each half-shell comprises a side face 5, which, in this particular case, constitutes a bottom for each half-shell.

Since the primary structure has an elongate form which extends in a longitudinal direction, the half-shells 2, 3 are thus joined together at a joint plane parallel to the longitudinal direction and orthogonal to the bottom spar 1. That corresponds to a vertical or substantially vertical joint plane, when considering the final installation of the primary structure under the wing of an aircraft.

The first and the second half-shells are assembled together and reinforced using a tongue 6 which covers the space between the first free edge 21 and the second free edge 31. The tongue 6 is linked on the one end to the first half-shell and on the other end to the second half-shell. That is, the tongue 6 is attached over the joint portion between the first and the second half-shells. The tongue 6 may include two separate parts. The first part is a bottom tongue portion 61, ensuring or reinforcing the assembly on the bottom spar 1, and the second part is a top tongue portion 62 ensuring or reinforcing the assembly on the top spar 4.

Figure 5A:
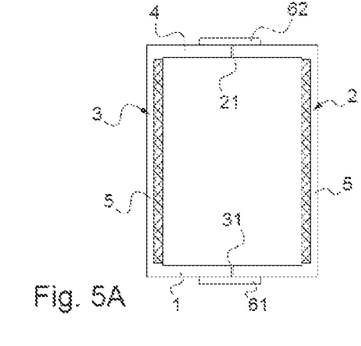
FIGS. 5A and 5B are schematic cross-sectional views of alternative methods of assembling two half-shells in accordance with an exemplary embodiment.

Referring to FIG. 5A, a first method of assembling the first and the second half-shells together is illustrated. The first free edge 21 is butt-jointed to the second free edge 31. The bottom tongue portion 61 and the top tongue portion 62 are assembled, by riveting, to the first half-shell 2 and to the second half-shell 3.

Figure 5B:
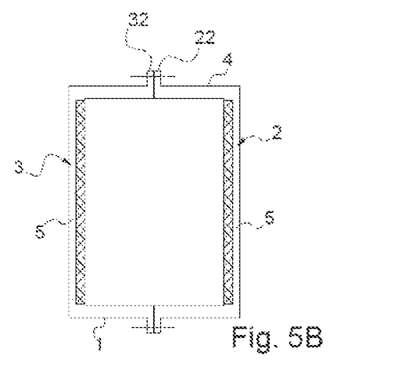

In other variants of the exemplary embodiment, other methods of assembly can be employed. For example, referring to FIG. 5B, a second method is illustrated in which the first free edge 21 comprises a first raised flange 22 and the second free edge 31 comprises a second raised flange 32. The first raised flange 22 and the second raised flange 32 can be brought to bear on one another and fixed to one another. This fixing can be performed by various means, such as rivets passing through said first and second raised flanges, or by spot welding. The first raise flange 22 is aligned with and pressed against the second raised flange 32 and secured together with rivets extending therethrough or spot welding the flanges together.

Figure 4:
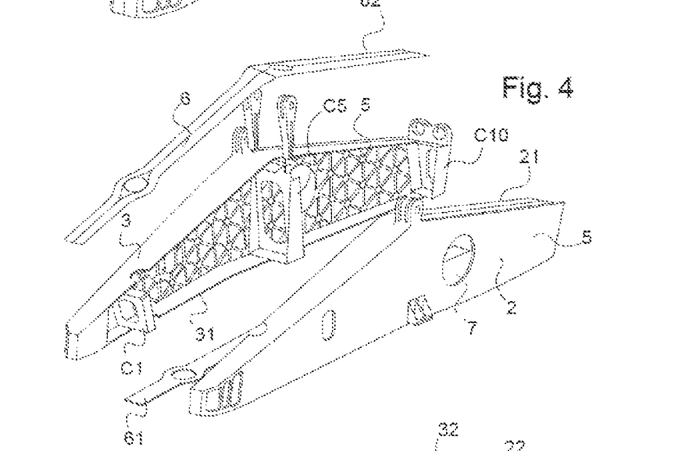
FIG. 4 is an exploded view of the primary support strut structure shown in FIG. 3.

Referring to FIG. 4, the primary support strut structure of an aircraft power plant comprises only three ribs interposed in the box formed by the assembly of the two half-shells 2, 3. The box-shaped configuration allow the number of ribs employed in the primary structure be reduced. In all the embodiments of the invention, the number, the position and, in some cases, the construction of the ribs can be adapted according to the mechanical characteristics sought for the primary structure to be constructed.

In particular, if the side walls 5 have adequate mechanical properties, particularly a significant bending resistance, only three ribs are necessary as in the example represented here:

a rear rib C10 and a central rib C5, which can in particular bear linking ties with the structure of an aircraft or take up the forces deriving from linking ties with the structure of an aircraft, and a front rib C1, which can partly take up the forces deriving from linking ties with an aircraft power plant.

At the central rib C5, linking ties with the structure of the aircraft can be of a single piece with said central rib, or added thereto (as in the example of FIG. 4).

In order for them to exhibit a greatly enhanced rigidity by comparison to a flat panel, the panels forming the side walls 5 can have a cellular structure. In particular, a panel is said to have cellular structure when it comprises, on at least one of its faces, cells, or open cavities. They generally form a regular pattern on (at least) one face of the panel.

The side walls 2 can thus have a cellular inner face, that is to say the face oriented towards the interior of the box of the primary structure.

Two types of cellular panels are more particularly contemplated to be within the scope of the disclosure. The side walls can thus have, in particular, an ISOGRID structure or an ORTHOGRID structure.

An ISOGRID structure has cells substantially in the form of isosceles triangles. The corners of the triangles therein may be rounded to enhance the mechanical performance levels of the panel, and limit the concentrations of stresses. Such a structure confers on the side walls a great rigidity in all the directions, but is complex to manufacture.

An ORTHOGRID structure has cells that are substantially of square form. The mechanical characteristics, in particular the rigidity, of such a structure are less great than for the ISOGRID structure, but such a cellular structure is simpler, and potentially less costly to produce.

When the side walls 5 have an ISOGRID cellular structure or the like, the primary structure that is finally constructed can have only three ribs. These three ribs are typically the rear rib C10, the central rib C5 and the front rib C1. A primary structure which will be greatly stressed may require the application of more ribs.

When the side walls 5 have an ORTHOGRID cellular structure or the like, more than three ribs are generally necessary. An example of primary structure comprising ten ribs is described hereinbelow with reference to FIG. 8 illustrating a second embodiment of the invention, but a number of ribs greater than three can also be necessary in the first embodiment illustrated in FIGS. 3 and 4.

Figure 6:
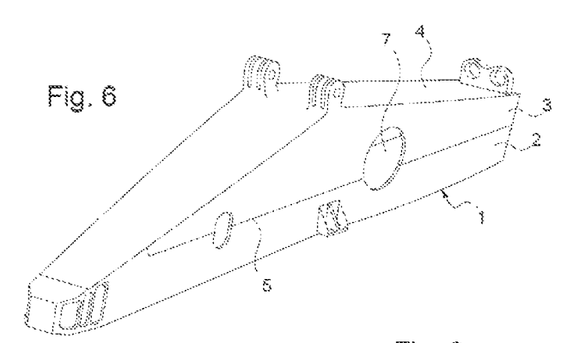
FIG. 6 is a perspective view of a primary support strut structure for an aircraft power plant in accordance with an exemplary embodiment.

Referring to FIG. 6, a second exemplary embodiment of the primary support structure is illustrated. Similar to the first embodiment described hereinabove, the primary support strut structure of an aircraft power plant (GP) is a box structure, comprising a first half-shell 2 and a second half-shell 3. The first half-shell and the second half-shell are assembled together along a joint plane which extends also longitudinally in the direction of extension of the primary support structure, but which is orthogonal to the joint plane of the first embodiment. That is, the joint plane is parallel to the bottom spar 1, and the side walls being substantially orthogonal to the bottom spar, the joint plane is orthogonal to the side walls and divides each of them into two parts.

The first spar can nevertheless be not totally flat, and in this case the joint plane can be parallel to a planar portion of the bottom spar, or it can be parallel to the plane passing through the ends of the bottom spar 1. Generally, the second embodiment represented in FIGS. 6 to 8 has a substantially horizontal joint plane, when considering the final installation of the primary structure under the wing of an aircraft. The joint plane is positioned at approximately mid-height of the box formed. Thus, the side walls are each divided into two by the joint plane.

Figures 7, 8:
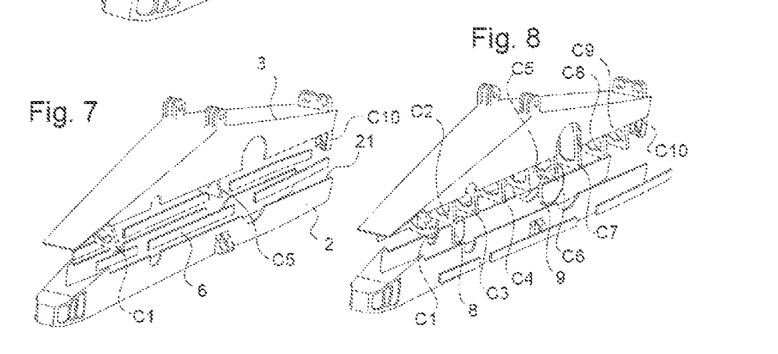
FIG. 7 is an exploded view of a primary support strut structure shown in FIG. 6.
FIG. 8 is an exploded view of a primary support strut structure in accordance with an exemplary embodiment.

Referring to FIG. 7, an exploded view of the primary support strut structure of an aircraft power plant is illustrated. In this embodiment, the primary support structure comprises only three ribs interposed in the box formed by assembly of the two half-shells 2, 3. The side walls 5 are cellular, for example of ISOGRID type, or have a similar stiffened structure.

Referring to FIG. 8, a variation of the primary support structure in FIG. 7 is illustrated. The primary support structure comprises a greater number of ribs, identical or close to the number of ribs employed. In this case, the primary support structure comprises ten ribs C1 . . . C10 interposed in the box formed by the two half-shells. The ribs are borne or attached within, prior to the assembly of the half-shells, the second half-shell 3, which is the half-shell comprising the top spar 4. The primary support structure may have a trapezoidal section, as presented for example in FIGS. 10 and 11. An initial positioning in the second half-shell allows the introduction of the ribs into the first half-shell, without mechanical interference, during the construction of the primary structure by assembly of the two half-shells 2, 3. Nevertheless, in some embodiments, the ribs whose height does not exceed that of the first half-shell, at their point of installation, can be initially linked to the first half-shell.

The assembly of the half-shells is ensured or reinforced using a tongue 6 which covers the joint along and between the first free edge 21 of the first half-shell 2 and the second free edge 31 of the second half-shell 3. The tongue 6 is linked on the one hand to the first half-shell and on the other hand to the second half-shell. The tongue 6 can also be linked to the ribs, in particular to the central rib C5.

The tongue 6 has, in the example represented here, several portions which are positioned on the join between the half-shells, at the side walls 5. The tongue 6 is composed of several portions, in the example represented, in order not to block the accesses 7 formed in the side walls 5 to allow access to the interior of the box of the primary structure. Such accesses 7 can be provided in all the embodiments of the invention.

In particular, when it is cut by the joint plane of the primary structure, the access 7 can be reinforced by a peripheral ring 8.

Figure 9A:
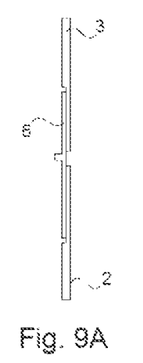
FIGS. 9A, 9B and 9C illustrate various ways that the two half-shells can be assembled.
Figure 9B:
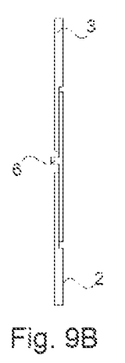

Two possibilities can be envisaged for the assembly of a box employing a tongue 6. The tongue 6 can be positioned on the outside of the box, as is represented in FIG. 9A, or be positioned inside the box, as is represented in FIG. 9B. The tongue 6 can have a T shape, as is represented in FIGS. 9A and 9B, in order to increase the rigidity thereof and, if necessary, to favor the correct positioning thereof.

In order to guarantee a smooth and even surface at the joint between the half-shells 2, 3, the free edges 21, 31 can be thinned over a width allowing the placement of the tongue 6. For example, the free edges can each be thinned over a width equivalent to or slightly greater than half the width of the tongue 6. The free edges can each be thinned to a depth corresponding to the thickness of the tongue 6. A similar thinning of the free edges allowing correct placement of the tongue can be employed, if necessary, in the first embodiment.

Figure 9C:
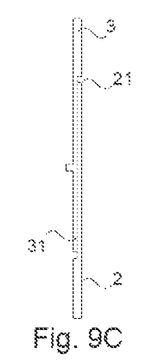

Referring to FIG. 9C, a method of assembly is illustrated in which the free edges 21, 31 are each thinned over the same width, and to a depth corresponding substantially to half their thickness, one to the outside of its half-shell and of the box (the second free edge 31 in the example represented) and the other to the inside of its half-shell and of the box (the first free edge 21 in the example represented). There is thus an area of overlap between the free edges 21, 31, which can be directly linked to one another. The reduction in width or thinning the free edges 21, 31 is to the extent that when the first and the second half-shells are assembled together, the overlapping portion of the free edges has a width that is substantially equal to the width of outer wall of the first half shell or second half shell.

Figure 10:
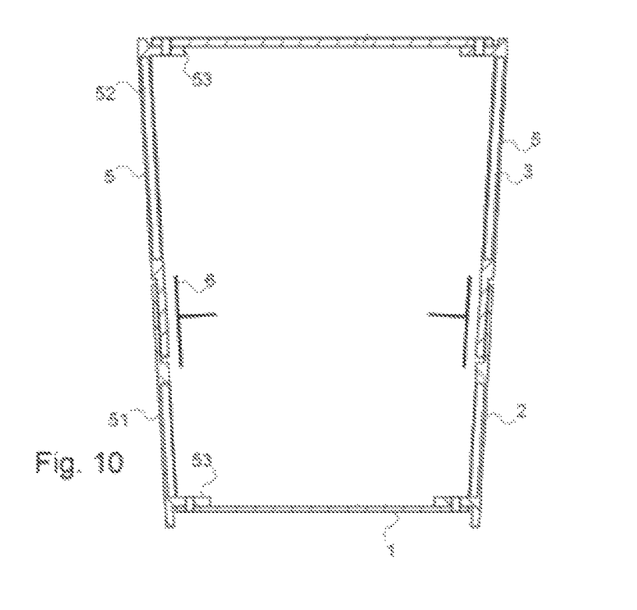
FIG. 10 is a cross-sectional schematic view of construction of a primary support strut structure of an aircraft power plant in accordance with an exemplary embodiment.

FIG. 10 presents, in more detail, the construction of a primary support strut structure of an aircraft power plant according to an exemplary second embodiment and assembled according to the method illustrated in FIG. 9C. The primary structure is represented in transverse cross section, along a cutting plane at right angles to the bottom spar 1 and to the side walls 5. The first half-shell 2 is formed by assembling the bottom spar 1 and the bottom side half-walls 51 together by, for example, riveting the bottom spar 1 onto a flange 53 formed on or added to the bottom side half-walls 51. The second half-shell 3 is formed by assembling the top spar 4 and top side half-walls 52 by, for example, riveting the top spar 4 onto a flange 53 formed on or added to the top side half-walls 52.

The half-shells 2, 3 are attached together by joining the free edges 21, 31 in the overlapping area. A reinforcing tongue 6 may be added inside the primary structure. In the linking area between the half-shells, where the free edges 21, 31 are thinned, the side walls 5 cannot have the cellular structure which rigidifies them. The tongue 6 may have a T profile, which reinforces the link and rigidifies the linking area between the half-shells.

Figure 11:
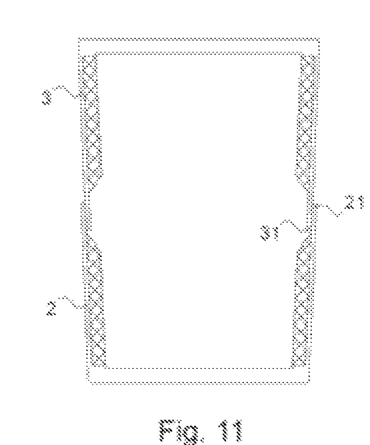
FIG. 11 is a cross-sectional schematic view of construction of a primary support strut structure of an aircraft power plant in accordance with an exemplary embodiment.
Figure 12:
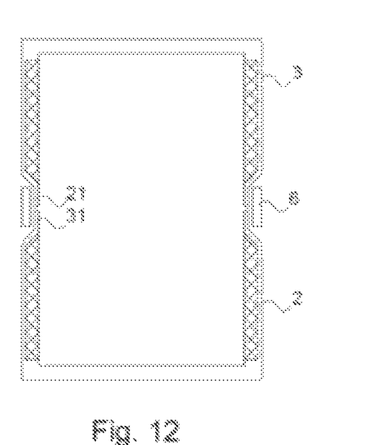
FIG. 12 is a cross-sectional schematic view of construction of a primary support strut structure of an aircraft power plant in accordance with an exemplary embodiment.

FIGS. 11 and 12 illustrate two examples of linking methods between the first half-shell 2 and the second half-shell 3. The half-shells in FIGS. 11 and 12 may be in a single piece or assembled as side half-walls on a spar. In FIG. 11, the second half-shell 3 has an open top face allowing the introduction of the free edge 21 of the first half-shell 2, although the free edges are not thinned. The free edges 21, 31 are then linked together by, for example, riveting.

Referring to FIG. 12, the free edges 21, 31 are butt jointed. The assembling is performed using a tongue 6, linked, for example, by riveting to each half-shell 2, 3. In order for the primary structure to have an even outer surface, the free edges 21, 31 have a double fold towards the interior of the box formed, so as to form a groove in which the tongue 6 is received.

Although the embodiments described above present the assembly of the half-shells along a joint plane, the free edges can have a more complex three-dimensional form. For example, the joint can be produced by a succession of joint planes, or along any curve, provided there is a match between the free edges 21, 31 of the first half-shell 2 and of the second half-shell 3.

In the exemplary embodiment disclosed above, several methods of obtaining each half-shell can be contemplated to be within the scope of the disclosure. Each half-shell can be obtained by, for example, riveting or welding, of partitions on a base substrate. In one embodiment, the substrate is a side wall 5, and half-spars are added to the edges of the side wall 5 so as to form a half-shell. In another embodiment, the base substrate is a spar (bottom or top) to which two side half-walls are added. In order to allow the assembly between the substrate and the added partitions, said substrate or said partition can comprise a flange, of a piece with or added to it.

As an alternative to the obtaining of the half-shells by assembly, the half-shells can be obtained by three-dimensional printing on a substrate. Thus, in the first embodiment, half-spars can be formed by printing on a side wall 5 to form a half-shell. In the second embodiment, side half-walls are formed by printing on a spar, in order to form a half-shell.

Therefore, the invention makes it possible to obtain a primary support strut structure of an aircraft power plant in a box that is simple and allows for a reduction of the costs and/or time and complexity of the assembly of the strut. The half-shell construction makes it possible to reduce the final cost price of the primary structure and of the strut and offers potential savings in terms of cycle time for the production of an aircraft power plant support strut.

The limiting of the number of ribs allowed in particular by the use of walls with cellular structure also frees up space inside the box structure which is formed, which allows this space to be allocated to functions other than the securing of the power plant, for example to the running electrical, hydraulic or fuel conduits.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A primary support strut structure for an aircraft power plant (GP) having a box-shaped structure, wherein the box-shaped structure comprises:
   a first half-shell comprising a first free edge;
   a second half-shell comprising a second free edge;
   wherein the first half-shell and the second half-shell are assembled together along a joint plane by joining the first free edge and the second free edge so as to form the box structure,
   a bottom spar and two side walls substantially orthogonal to the bottom spar, wherein the joint plane is orthogonal to the bottom spar and splits the bottom spar longitudinally into two, thereby dividing the box into two symmetrical parts.

2. The primary support strut structure according to claim 1, in which the first free edge is butt-jointed to the second free edge.

3. The primary support strut structure of claim 1, wherein the side walls have a cellular structure.

4. The primary support strut structure of claim 3, further comprising three ribs interposed transversely in the box structure.

5. The primary support strut structure according to claim 4, wherein the first free edge and the second free edge have an area of overlap.

6. The primary support strut structure according to claim 5, further comprising at least one tongue which covers the joint between the first free edge and the second free edge, the tongue being linked to the first half-shell and to the second half-shell.

7. A primary support strut structure for an aircraft power plant (GP) having a box-shaped structure, wherein the box-shaped structure comprises:
   a first half-shell comprising a first free edge;
   a second half-shell comprising a second free edge;
   wherein the first half-shell and the second half-shell are assembled together along a joint plane by joining the first free edge and the second free edge so as to form the box structure; and a bottom spar and two side walls substantially orthogonal to the bottom spar, wherein the joint plane is orthogonal to the side walls, each of which is divided into two parts.

8. The primary support strut structure of claim 7, wherein the side walls have a cellular structure.

9. The primary support strut structure according to claim 7, in which the first free edge is butt-jointed to the second free edge.

10. A method of manufacturing a primary support strut structure for an aircraft power plant, comprising the steps of:
   forming a first half-shell comprising a first free edge;
   forming a second half-shell comprising a second free edge;
   assembling the first half-shell and of the second half-shell by joining the first free edge and the second free edge thereby forming a box structure, wherein the primary support structure comprises a bottom spar and two side walls substantially orthogonal to the bottom spar, wherein the joint plane is orthogonal to the bottom spar and splits the bottom spar longitudinally into two, thereby dividing the box into two symmetrical parts.

11. An aircraft engine support strut, comprising:
   a first half-shell having a first peripheral edge extending outwardly from a first side wall bounding a first opening;
   a second half-shell having a second peripheral edge extending outwardly from a second side wall bounding a second opening;
   wherein the first half-shell and the second half-shell are attached together along said first and second peripheral edges;
   a bottom spar and two side walls substantially orthogonal to the bottom spar, wherein the joint plane is orthogonal to the bottom spar and splits the bottom spar longitudinally into two, thereby dividing the box into two symmetrical parts; and,
   a tongue member attached to the first half-shell and the second half-shell along the joint at the peripheral edges.

12. The aircraft engine support strut of claim 11, wherein the first side wall further comprises a first lattice structure disposed on an inner surface thereof, and the second side wall further comprises a second lattice structure disposed on an inner surface thereof.

13. The aircraft engine support strut of claim 12, wherein a portion of the first peripheral edge overlaps with a portion of the second peripheral edge when the first half-shell and the second half-shell are attached together.

* * * * *